United States Patent [19]

Eneim et al.

[11] Patent Number: 5,713,610
[45] Date of Patent: Feb. 3, 1998

[54] SEMI-PERMANENT VACUUM CLOSURE WITH MULTIPLE RETUBULATION CAPABILITY

[75] Inventors: Arthur A. Eneim, Steamboat Springs, Colo.; Tom K. Evans; Timothy S. Romano, both of Goleta, Calif.; Gary B. Hughes, Philadelphia, Pa.

[73] Assignee: Santa Barbara Research Center, Goleta, Calif.

[21] Appl. No.: 543,099

[22] Filed: Oct. 13, 1995

[51] Int. Cl.$^6$ ............................................. F16L 5/12
[52] U.S. Cl. .................. 285/220; 220/2.2; 174/65 R; 174/11 BH; 174/17.05
[58] Field of Search ...................... 220/2.2; 174/65 R, 174/50.5, 50.62, 17.05, 8, 11 BH; 285/219, 220, 96; 445/43; 228/60

[56] References Cited

U.S. PATENT DOCUMENTS

| | | | |
|---|---|---|---|
| 3,771,278 | 11/1973 | Gray et al. | 220/2.2 X |
| 4,140,337 | 2/1979 | Arcella et al. | 285/219 X |
| 4,468,309 | 8/1984 | White | 285/55 X |
| 4,570,983 | 2/1986 | Olenfalk et al. | 285/220 X |
| 5,359,148 | 10/1994 | Okase et al. | 118/733 X |
| 5,433,639 | 7/1995 | Zahuta et al. | 445/43 X |
| 5,598,966 | 2/1997 | Romano et al. | 288/124.6 |

FOREIGN PATENT DOCUMENTS

| | | |
|---|---|---|
| 5-248578 | 9/1993 | Japan. |
| 784009 | 10/1957 | United Kingdom ........... 220/2.2 |

*Primary Examiner*—Terry Lee Melius
*Assistant Examiner*—Heather Shackelford
*Attorney, Agent, or Firm*—W. C. Schubert; W. K. Denson-Low

[57] ABSTRACT

A vacuum system (20) includes an enclosure (22) having a vacuum-tight wall (26) and an internally threaded aperture (66) through the wall (26). A tip-off fitting (24) has a base (50) with a bore (52) therethrough, a hollow tube (62) fixed to the base (50) with a vacuum-tight seal, such that an interior (64) of the tube (62) is in communication with the bore (52) in the base (50), and an external thread (58) on the exterior of the base (50). The external thread (58) on the exterior of the base (50) is dimensioned to threadably engage the internal thread (68) on the aperture (66). There is a disengageable vacuum sealant (70) such as a layer of indium metal between the external thread (58) of the base (50) and the internal thread (68) of the aperture (66). The vacuum system (20) is evacuated through the tip-off fitting (24) and sealed by closing off the hollow tube (62). At a later time, the vacuum system can be brought to atmospheric pressure and then reseated by replacing the tip-off fitting with another tip-off fitting and repeating the evacuation and sealing.

12 Claims, 2 Drawing Sheets

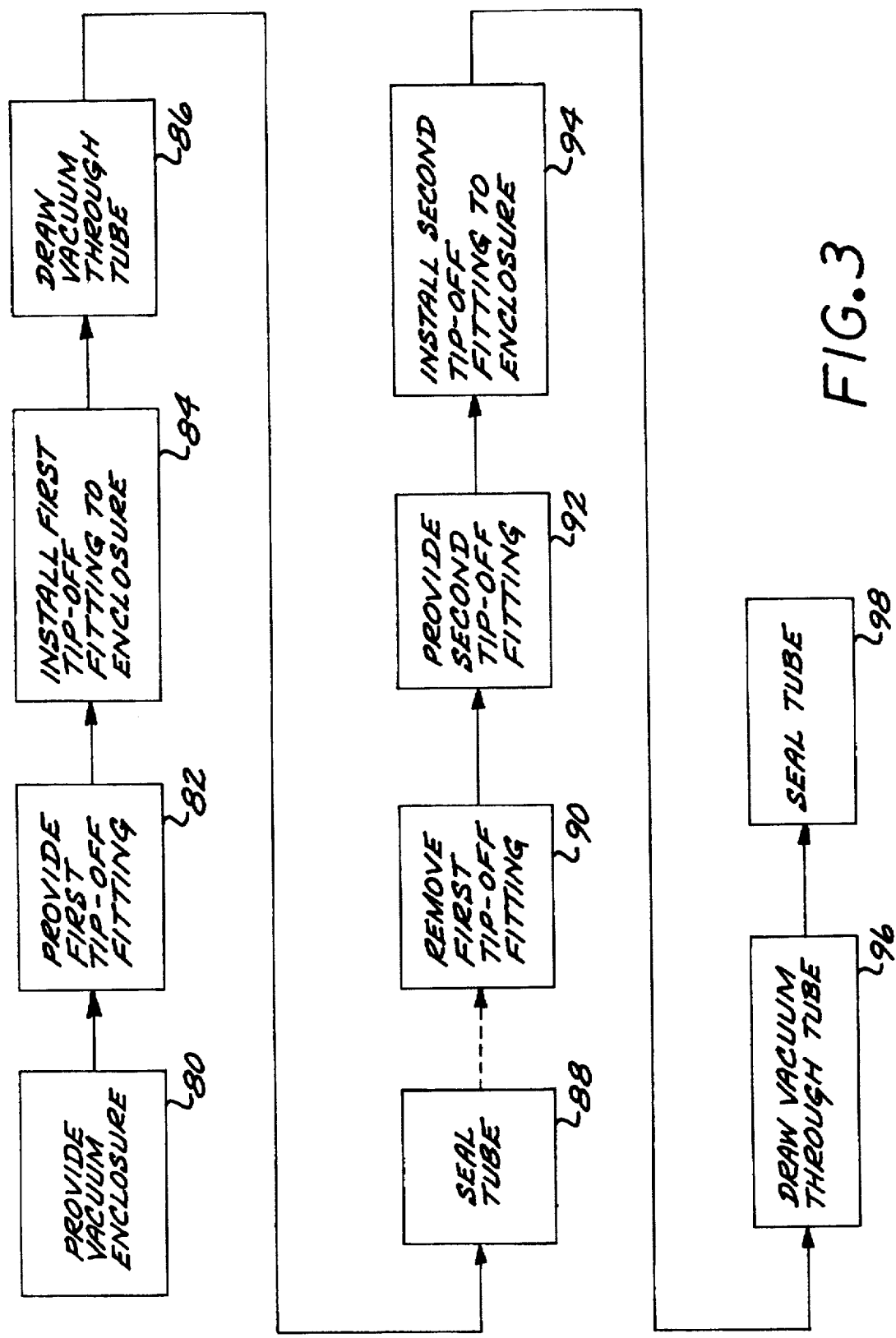

SEMI-PERMANENT VACUUM CLOSURE WITH MULTIPLE RETUBULATION CAPABILITY

BACKGROUND OF THE INVENTION

This invention relates to vacuum systems, and, more particularly, to a semi-permanently sealable vacuum system which can be sealed but later opened and then resealed.

Some vacuum systems require the capability for evacuation and subsequent sealing that is intended to be permanent. However, it may be necessary to open the vacuum system after the "permanent" sealing is completed and then to again "permanently" seal the vacuum system. In one example, an infrared sensor is operated in a vacuum at reduced temperature, in a vacuum system enclosure constructed as a vacuum dewar. The sensor and related structure are assembled within a wall of the vacuum system. To evacuate and seal the system, a vacuum is drawn through a tube that projects from the side of the wall, termed a "tip-off tube". After the vacuum is drawn inside the enclosure, the tip-off tube is mechanically pinched off to effect a cold-weld seal that is vacuum tight.

Although the sensor system is tested during construction and assembly into the enclosure, a fault is sometimes detected after sealing is completed. To correct the fault, the vacuum enclosure is unsealed and the sensor system is reworked. The vacuum enclosure must thereafter be permanently reseated. In the conventional approach, a hole is drilled in the side of the existing tip-off tube, and a second tip-off tube of smaller diameter is soldered into that hole. The evacuation and tip-off procedure is repeated, using the second, smaller-diameter tip-off tube. While operable, this approach has the disadvantage that the operation is tedious and time consuming, can introduce drilling debris into the interior of the vacuum system, produces a smaller evacuation path which requires a longer evacuation time, and increases the risk of damage to the vacuum enclosure and the sensor system. The resulting system is less robust than a conventional vacuum system of this type.

There is a need for an improved approach for accomplishing permanent sealing of vacuum systems with a capability for opening and subsequent permanent resealing of the vacuum system, herein termed a "semi-permanent" vacuum closure. The present invention fulfills this need, and further provides related advantages.

SUMMARY OF THE INVENTION

The present invention provides a semi-permanent vacuum closure, a vacuum system in which it is used, and a method for its use in a semi-permanent vacuum sealing procedure. The approach of the invention permits the vacuum system to be sealed with a permanent vacuum-tight seal, later opened for rework of interior components or other reason if necessary, and then again sealed with a permanent vacuum-tight seal. The resealing is accomplished using the same approach as the original sealing, which is familiar to the personnel who do the resealing operation. There is no introduction of contaminants into the interior of the vacuum system during the resealing operation. The resealing is accomplished in the same time as the original sealing operation. The risk of damage to the vacuum system and its components during the resealing operation is minimal.

In accordance with the invention, a vacuum system comprises an enclosure having a vacuum-tight wall that defines an interior of the enclosure, and a tip-off fitting. The tip-off fitting comprises a base having a bore therethrough, and a hollow tube fixed to the base with a vacuum-tight seal, such that an interior of the tube is in communication with the bore in the base. There is also means for removably joining the tip-off fitting to the wall of the enclosure such that the bore of the tip-off fitting communicates with the interior of the enclosure. The means for removably joining forms a vacuum-tight seal between the tip-off fitting and the wall of the enclosure.

In one embodiment, a vacuum system comprises an enclosure having a vacuum-tight wall that defines an interior of the enclosure, and an aperture through the wall of the enclosure with an internal thread therein. A tip-off fitting includes a base having a bore therethrough, a hollow tube fixed to the base with a vacuum-tight seal such as a braze joint, so that an interior of the tube is in communication with the bore in the base, and an external thread on the exterior of the base. The external thread on the exterior of the base is dimensioned to threadably engage the internal thread on the aperture. A disengageable vacuum sealant such as a layer of indium metal is placed between the external thread and the internal thread.

These embodiments allow semi-permanent closure of the vacuum system. A first tip-off fitting with the structure as described is installed into the aperture of the wall of the enclosure, the enclosure is evacuated through the tube of the tip-off fitting, and the tube is mechanically pinched off. If the enclosure is later opened for any reason, the entire first tip-off fitting is removed and a second tip-off fitting of the same structure is installed in its place. The evacuation and sealing process is repeated to permanently seal the vacuum enclosure.

The present invention provides an advance in the art of semi-permanent sealing of vacuum systems. The re-evacuation and re-sealing operation is readily and cleanly performed using the same techniques as the first evacuation and sealing operation. Multiple re-evacuation and resealing operations can be performed as easily, if necessary.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a block flow diagram of a method for the utilization of the invention.

DETAILED DESCRIPTION OF THE INVENTION

Figure 1:
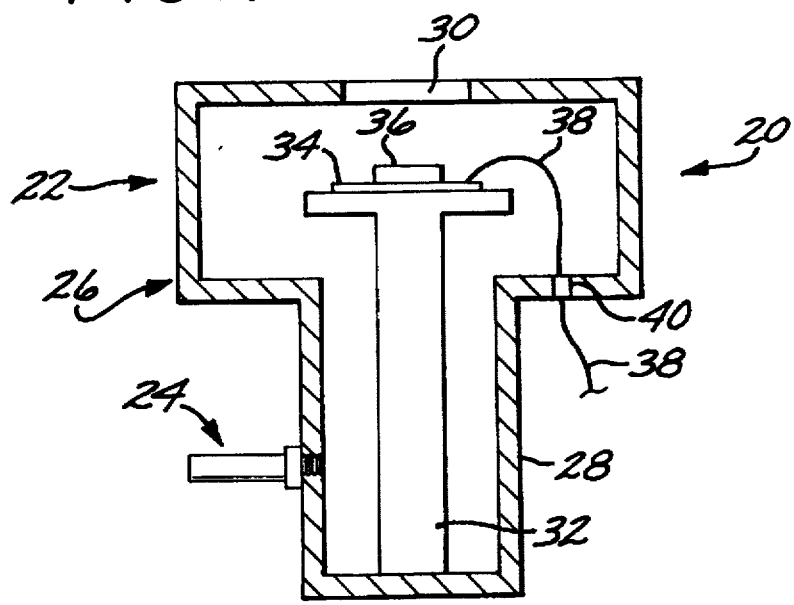
FIG. 1 is a schematic sectional view of a vacuum system according to the invention.

FIG. 1 depicts a vacuum system 20, which is depicted in its preferred form as a vacuum dewar with an infrared sensor system therein. The vacuum system 20 includes a vacuum enclosure 22 and a tip-off fitting 24. The vacuum enclosure 22 has a vacuum-tight wall 26 that preferably includes a metal housing 28 and a forwardly facing window 30, which is transparent to infrared radiation, mounted to the housing 28. The enclosure 22 is typically made in two parts, an upper housing and a lower housing, to provide access to the interior of the enclosure during manufacture, but which are sealed together after the sensor system is installed in the enclosure.

A pedestal 32 is supported on the metal housing 28 at a location remote from the window 30. A sensor electronics package 34 and sensor 36 are mounted to the top of the pedestal 32 with the sensor 36 facing the window 30. Electronic leads 38 extend from the sensor electronics package 34 to an electrical feedthrough 40 in the wall 26, and thence to external electronics (not shown). The structure of the sensor electronics package 34 and the sensor 36 are known in the art.

In conventional practice, a copper tip-off tube is provided in the wall of the enclosure. After the sensor system is assembled inside the enclosure, a vacuum is applied to the tip-off tube exterior to the enclosure, to evacuate the interior of the enclosure. After the desired vacuum is achieved, the copper tip-off tube is mechanically pinched off to seal the tube against any vacuum leak therethrough. This seal has been found to be "permanent", as that term is used herein, in the sense that there is no vacuum leak during storage and use of the apparatus, even with exposure to a range of temperatures and other storage and operating conditions. By contrast, other techniques have been found to be more prone to vacuum leaks over extended periods of time. While operable, this approach has the shortcoming that rework of the components inside the enclosure is difficult. A previously preferred approach for re-evacuating and re-sealing was described previously, but it also has drawbacks.

Figure 2:
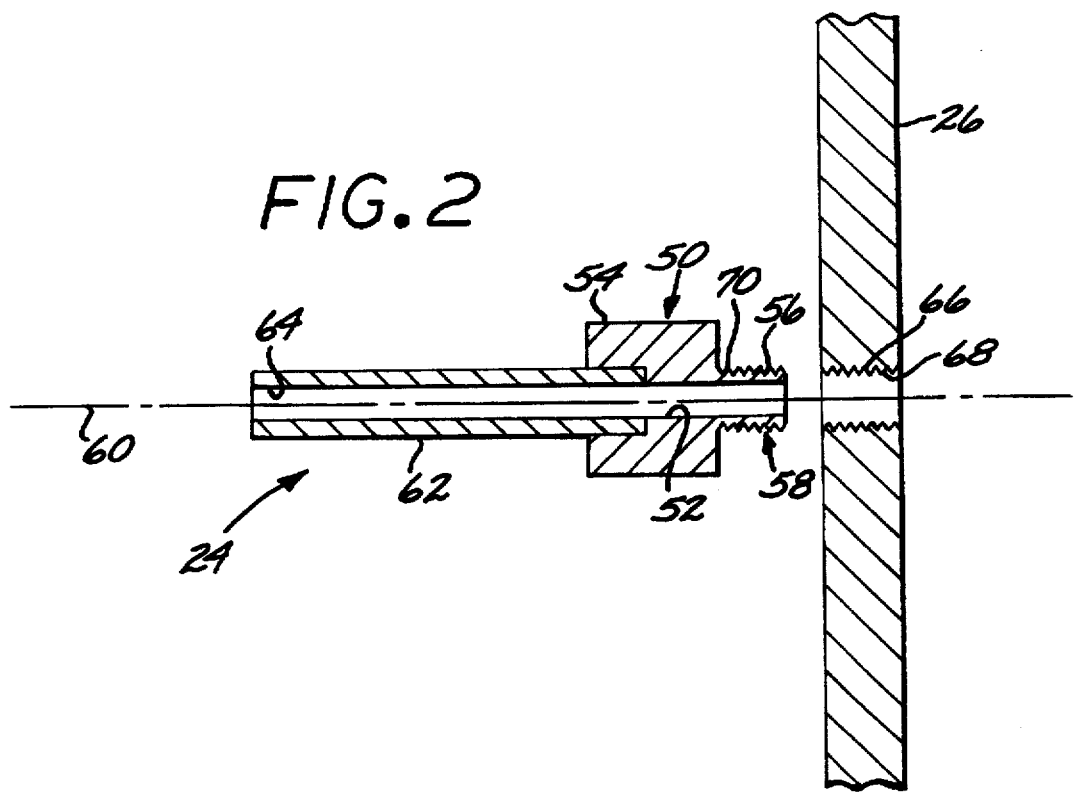
FIG. 2 is an enlarged sectional view of a tip-off fitting and adjacent portion of the wall of the vacuum enclosure.

In the present approach, by contrast, the re-evacuating and re-sealing is accomplished using the approach of the tip-off fitting 24, which is shown in greater detail in FIG. 2. The tip-off fitting 24 includes a base 50 having a bore 52 therethrough. The base 50 is preferably made of the same material as the metallic portion of the wall 26. Most preferably, the base 50 and the portion of the wall 26 to which it is engaged (as discussed subsequently) are made of stainless steel or kovar (iron-nickel) alloy. The base 50 has a cup-shaped body 54 and an extension 56 that has an external thread 58 thereon. When the base 50 is installed to the wall 26, the cup of the body 54 faces outwardly. The base 50 is preferably cylindrically symmetric, with the body 54 and the extension 56 disposed about an axis of symmetry 60, and with the bore 52 lying along the axis of symmetry 60.

A hollow tube 62 is fixed to the interior of the cup-shaped base 50, preferably by brazing. Preferably, the tube 62 is made of copper and is brazed to the base 50 to form a vacuum-tight seal between the tube 62 and the base 50. An interior bore 64 of the tube 62 communicates with the bore 52, forming a continuous gas path along the length of the tip-off fitting.

The wall 26 has an aperture 66 therethrough, in the portion of the wall that is metallic. The aperture 66 has an internal thread 68. The extension 56, external thread 58, aperture 66, and internal thread 68 are dimensioned and selected so that the tip-off fitting 24 can be threadably engaged to the wall 26 with a sealant therebetween.

At least one of the threads 58 and 68 preferably has a disengageable vacuum sealant 70 thereon. The disengageable vacuum sealant is "semi-permanent", as that term is used herein, in that it forms a vacuum seal that does not deteriorate with time or exposure to elevated or reduced temperatures but does, however, permit intentional disengagement of the threads 58 and 68 and subsequent re-sealing. The preferred sealant is indium metal coated onto the external thread 58 by winding a small-gage (about 0.010 inches) wire into the external threads 58 and then screwing the base 50 into the wall 26. Indium metal produces a good vacuum seal that can later be disengaged, and also has a low vapor pressure so that the interior vacuum can be maintained at a satisfactory level over extended periods of time. As the threads 58 and 68 are engaged during sealing, the indium metal deforms to fill the spaces between the threads to produce a tight vacuum seal.

FIG. 3 depicts a method of using the approach of the invention to retubulate the vacuum system. The vacuum enclosure 22, with the electronics, sensor, and other interior structure in place, is provided, numeral 80. A first tip-off fitting 24 is provided, numeral 82. The first tip-off fitting 24 is installed to the wall 26 of the enclosure 22, numeral 84, using the threaded engagement of the indium-coated external thread 58 to the internal thread 68. A vacuum is drawn on the external end of the tube 62, numeral 86, for a period to permit the pressure within the enclosure 22 to fall to a desired level. The tube 62 is sealed, numeral 88, by mechanically pinching off the tube to form a vacuum-tight cold weld, while the vacuum remains applied. The indium metal placed at the threaded joint 58/68 has been found to sustain a satisfactory vacuum over extend periods of time and also to lock the threads together so that they do not unintentionally loosen or disengage due to vibration, temperature changes, or other influences.

The normal assembly of the system 20 is completed. Electronic checks are performed on the electronics 34 and sensor 36, both immediately after sealing and after storage for a period of time. If a fault is found, the interior of the system 20 is exposed to atmospheric pressure by breaking the vacuum seal, and the enclosure 22 is opened to permit repair of the fault. During this step, the tip-off fitting 24 is removed from the wall 26, numeral 90, by unscrewing the threads 58 from the threads 68. The sealant 70 permits this intentional disengagement when performed carefully. After repairs are complete, the enclosure 22 is closed, and it is necessary to re-evacuate and reseat the enclosure. To accomplish this reclosure and resealing, a second tip-off fitting 24', identical in structure to the first tip-off fitting 24 in its original state, is provided, numeral 92, and installed, numeral 94, by the same approach previously discussed using new sealant 70 material of the same type as used previously. A vacuum is drawn through a tube 62' of the second tip-off fitting 24, and the tube 62' is sealed in the manner previously discussed for the first tip-off fitting 24. Re-evacuation and resealing are thereby accomplished quickly and easily, without risk of damage to the vacuum system due to the need to rework the original evacuation and tip-off structure.

The present invention has been reduced to practice using the preferred need to rework the original evacuation and tip-off structure.

The present invention has been reduced to practice using the preferred approach described herein. An original tubulation and four retubulations (using a total of five tip-off fittings) were performed on a single vacuum system of the type described herein. After each new tip-off fitting was installed and the system evacuated and sealed, the hermeticity of the vacuum system was checked and confirmed with a vacuum gauge in the interior of the vacuum system. The vacuum system was then cooled to −80° C. and the vacuum level was again checked, prior to warming to ambient temperature, opening the system, and installing the next tip-off fitting. In all cases, the vacuum level and performance were acceptable.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A vacuum system, comprising:
   an enclosure having a vacuum-tight wall that defines an interior of the enclosure;
   a tip-off fitting, the tip-off fitting comprising
   a base having a bore therethrough, and
   a hollow tube fixed to the base with a vacuum-tight seal, such that an interior of the tube is in communication with the bore in the base; and
   means for removably joining the tip-off fitting to the wall of the enclosure such that the bore of the tip-off fitting communicates with the interior of the enclosure, the means for removably joining forming a vacuum-tight seal between the tip-off fitting and the wall of the enclosure.

2. A vacuum system, comprising:
   an enclosure having a vacuum-tight wall that defines an interior of the enclosure;
   an electronic device supported within the interior of the enclosure,
   a tip-off fitting, the tip-off fitting comprising
   a base having a bore therethrough, and
   a hollow tube fixed to the base with a vacuum-tight seal, such that an interior of the tube is in communication with the bore in the base;
   means for removably joining the tip-off fitting to the wall of the enclosure such that the bore of the tip-off fitting communicates with the interior of the enclosure, the means for removably joining forming a vacuum-tight seal between the tip-off fitting and the wall of the enclosure.

3. The vacuum system of claim 2, wherein the means for removably joining comprises:
   an aperture in the wall of enclosure having internal thread thereon, and
   an external thread on the base of the tip-off fitting, the external thread of the base being dimensioned to threadably engage the internal thread of the aperture.

4. The vacuum system of claim 3, further including
   a sealant coated onto at least one of the internal thread and the external thread.

5. The vacuum system of claim 4, wherein the sealant is a metal.

6. The vacuum system of claim 4, wherein the sealant is indium.

7. The vacuum system of claim 2, wherein the wall of the enclosure and the base of the tip-off fitting are made of the same metal.

8. A vacuum system, comprising:
   an enclosure having a vacuum-tight wall that defines an interior of the enclosure;
   an aperture through the wall of the enclosure, the aperture having an internal thread therein;
   a tip-off fitting, the tip-off fitting comprising
   a base having a bore therethrough,
   a hollow tube fixed to the base with a vacuum-tight seal, such that an interior of the tube is in communication with the bore in the base, and an external thread on the exterior of the base, the external thread on the exterior of the base being dimensioned to threadably engage the internal thread on the aperture; and
   a disengageable vacuum sealant between the external thread and the internal thread.

9. The vacuum system of claim 8, wherein the disengageable vacuum sealant is a layer of a metal, and the metal is indium.

10. The vacuum system of claim 8, wherein the wall of the enclosure and the base of the tip-off fitting are made of the same metal.

11. A vacuum system, comprising:
    an enclosure having a vacuum-tight wall that defines an interior of the enclosure;
    an electronic device supported within the interior of the enclosure,
    an aperture through the wall of the enclosure, the aperture having an internal thread therein;
    a tip-off fitting, the tip-off fitting comprising
    a base having a bore therethrough,
    a hollow tube fixed to the base with a vacuum-tight seal, such that an interior of the tube is in communication with the bore in the base, and
    an external thread on the exterior of the base, the external thread on the exterior of the base being dimensioned to threadably engage the internal thread on the aperture; and
    a disengageable vacuum sealant between the external thread and the internal thread.

12. The vacuum system of claim 8, wherein the hollow tube is made of copper.

* * * * *